Patented Feb. 14, 1939

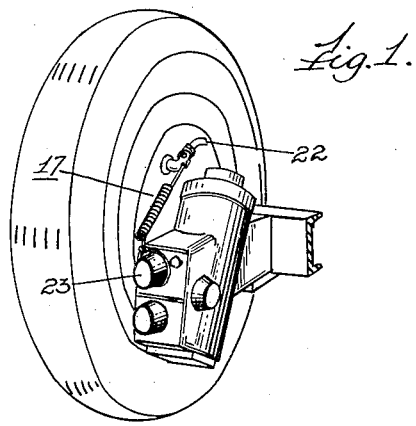
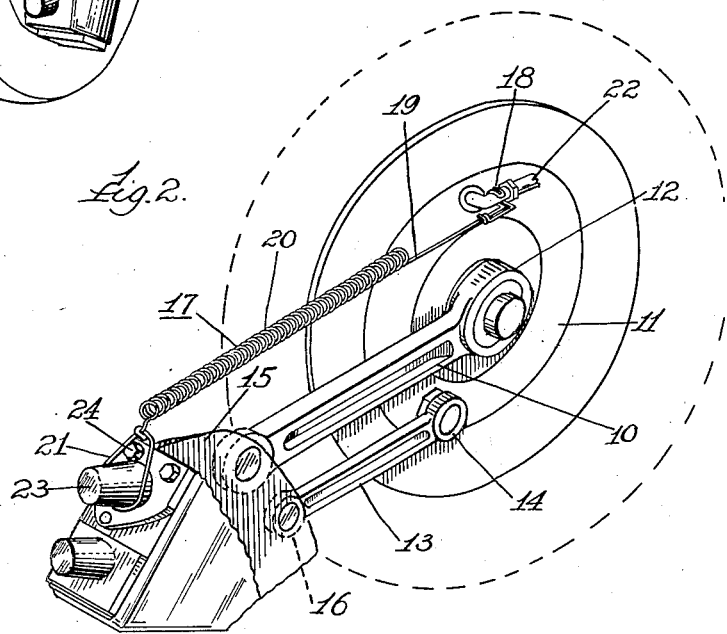
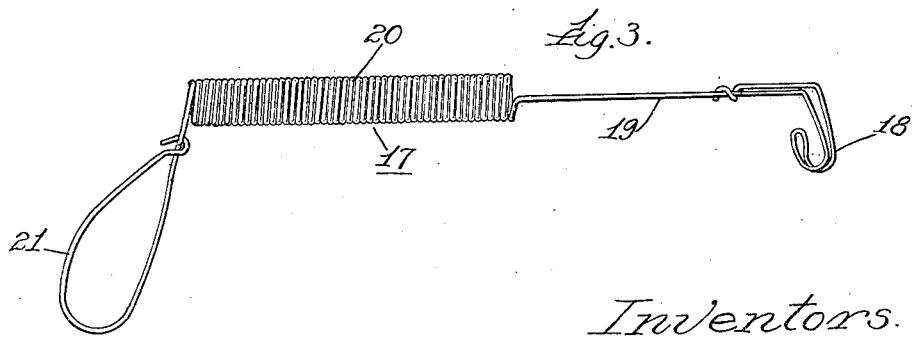

2,147,178

UNITED STATES PATENT OFFICE 2,147,178

FRONT BRAKE PLATE AND RADIUS ARM TENSION SPRING

Elwyne O. Shreffler and Aaron D. Lesage, Manteno, Ill.

Application July 25, 1938, Serial No. 221,052

2 Claims. (Cl. 267—20)

In the 1934-8 model Chevrolet and the 1934-6 model Pontiac automobiles a knee action construction is installed. Wear creates loose and rattling front brake plates and radius arms in this construction. Lubrication becomes difficult because the grease is pumped out of the loose joints thereby causing greater wear on the parts.

Among the objects of our invention is to provide a readily attachable means for holding worn front brake plates and radius arms in their places under correct tension so as to positively and permanently remove all rattles and noise out of these parts, to stop any further fast wearing of the parts, and to retain the lubricant in the joints, and such other objects, advantages and capabilities as will later more fully appear and which are inherently possessed by our invention.

While we have shown in the accompanying drawing a preferred form of our invention yet we desire it understood that the same is susceptible of modification and change without departing from the spirit of our invention.

Referring to the drawing Fig. 1 is a perspective view of our tension spring in position in actual use, Fig. 2 is a cut away sectional view showing in detail our tension spring, the brake plate and the radius arm, Fig. 3 is a detail view of the preferred embodiment of our tension spring.

In the 1934-8 model Chevrolet and the 1934-6 model Pontiac cars the knee arm 10 is rotatably attached to the brake plate 11 at joint 12. The radius arm 13 is pivotally attached at one end to the brake plate 11 to form joint 14. The radius arm 13 is pivotally attached at its other end to the mounting bracket 15 to form joint 16. Wear creates looseness in joints 12, 14 and 16 so that there is considerable rattling and noise. Wear is accelerated because grease in the loose joints is pumped out of the same during operation.

In combination with the above recited structure the preferred means selected for illustrating the solution of the problem created therein comprises a tension spring 17 formed preferably of a single length of wire, cable or the like. At one end of said spring 17 the wire is doubled and bent to form a hook 18. Extending from the hook 18 the spring has a straight portion 19 followed by a coiled portion 20 consisting of a plurality of coils and ending at its opposite end in a loop 21.

Our spring 17 is installed as follows. The wheels of the car are cramped sharply to the right. The hook 18 is slipped over the brake cable 22 and moved forward until it rests against the brake plate 11. Then from the loop end 21 the spring 17 is turned about one half a turn in the same direction of the spring winding. The spring 17 is pulled forward and the loop 21 is slipped over the top shock absorber housing 23 and outer top bolt 24 thereon.

In operation our spring 17 exerts a forward pull on the brake plate 11 so that the brake plate 11 bears directly against the knee arm 10 at joint 12 in the same position as during the braking of the car, thus preventing play in joint 12. Because the spring is positioned and extends at an angle forwardly and inwardly, pressure is also exerted inwardly on the brake plate 11 against the hub.

The spring 17 by exerting pressure on the brake plate 11 at the top also pulls the radius arm 13 attached to the brake plate 11 at the bottom and exerts pressure backwardly so that the radius arm 13 is held against the brake plate 11 at one end and against the mounting bracket 15 at the other end, thus preventing play in joints 14 and 16.

Having thus described our invention, we claim:

1. In combination with a knee action construction having a top shock absorber housing, a knee arm rotatably attached to a brake plate, and a radius arm pivotally attached at one end to the brake plate and at the other end to a mounting bracket, said places of attachment forming joints which become loose with wear so as to rattle and expel lubricant, a tension spring doubled and bent back on itself to form a hook at one end, said spring extending inwardly from said hook in a substantially straight line, followed by a plurality of coils and curved downwardly and back upwardly on itself to form a loop said hook adapted to be slipped over the brake cable of the brake plate so as to rest against the brake plate, said loop adapted to be slipped over said top shock absorber housing, said spring so positioned exerting pressure on said brake plate at the top forwardly and inwardly so as to eliminate play in the joint of the knee arm and brake plate, said spring also exerting pressure on said brake plate at the bottom rearwardly so as to eliminate play in the joints between the radius arm and the mounting bracket and the radius arm and the brake plate.

2. In combination with a knee action construction having a top shock absorber housing, a knee arm rotatably attached to a brake plate, and a radius arm pivotally attached at one end to the brake plate and at the other end to a mounting bracket, said places of attachment forming joints which become loose with wear so as to rattle and expel lubricant, a tension spring, said spring having means for attachment on one end to the brake plate, and on the other end to the top shock absorber housing, said spring so positioned exerting pressure on said brake plate at the top forwardly and inwardly so as to eliminate play in the joint of the knee arm and brake plate, said spring also exerting pressure on said brake plate at the bottom rearwardly so as to eliminate play in the joints between the radius arm and the mounting bracket and the radius arm and the brake plate.

ELWYNE O. SHREFFLER.
AARON D. LESAGE.